US007573868B2

(12) United States Patent
Cutler et al.

(10) Patent No.: US 7,573,868 B2
(45) Date of Patent: Aug. 11, 2009

(54) AUDIO/VIDEO SYNCHRONIZATION USING AUDIO HASHING

(75) Inventors: Ross G. Cutler, Duvall, WA (US); Alan L. Bridgewater, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 11/165,946

(22) Filed: Jun. 24, 2005

(65) Prior Publication Data

US 2006/0291478 A1 Dec. 28, 2006

(51) Int. Cl.
*H04L 12/66* (2006.01)
(52) U.S. Cl. ...................... 370/352; 370/400; 370/401; 370/265; 370/266; 370/267
(58) Field of Classification Search ............ 370/395.52, 370/260–267, 349, 352, 356, 400, 401; 709/204, 709/205, 227, 231, 246, 247, 248
See application file for complete search history.

(56) References Cited

U.S. PATENT DOCUMENTS

| 5,539,483 | A | 7/1996 | Nalwa |
| 5,745,305 | A | 4/1998 | Nalwa |
| 5,793,527 | A | 8/1998 | Nalwa |
| 5,990,934 | A | 11/1999 | Nalwa |
| 6,043,837 | A | 3/2000 | Driscoll, Jr. et al. |
| 6,111,702 | A | 8/2000 | Nalwa |
| 6,115,176 | A | 9/2000 | Nalwa |
| 6,128,143 | A | 10/2000 | Nalwa |
| 6,141,145 | A | 10/2000 | Nalwa |
| 6,144,501 | A | 11/2000 | Nalwa |
| 6,161,137 | A * | 12/2000 | Ogdon et al. ............... 709/224 |
| 6,195,204 | B1 | 2/2001 | Nalwa |
| 6,219,089 | B1 | 4/2001 | Driscoll, Jr. et al. |
| 6,219,090 | B1 | 4/2001 | Nalwa |
| 6,285,365 | B1 | 9/2001 | Nalwa |
| 6,331,869 | B1 | 12/2001 | Furlan et al. |
| 6,337,708 | B1 | 1/2002 | Furlan et al. |
| 6,356,397 | B1 | 3/2002 | Nalwa |
| 6,466,254 | B1 | 10/2002 | Furlan et al. |
| 6,539,547 | B2 | 3/2003 | Driscoll, Jr. et al. |
| 6,700,711 | B2 | 3/2004 | Nalwa |
| 6,981,022 | B2 * | 12/2005 | Boundy ....................... 709/204 |
| 7,143,177 | B1 * | 11/2006 | Johnson et al. ............. 709/231 |
| 7,313,593 | B1 * | 12/2007 | Pulito et al. ................. 709/204 |
| 2004/0021764 | A1 | 2/2004 | Driscoll, Jr. et al. |

FOREIGN PATENT DOCUMENTS

| WO | WO 00/08889 | 2/2000 |
| WO | WO 2005/002201 | 1/2005 |

* cited by examiner

*Primary Examiner*—Wing F Chan
*Assistant Examiner*—Mark A Mais

(57) ABSTRACT

Audio and video frames are synchronized by hashing an audio frame at a sender and combining the resultant hash value with the video frame. The audio frame is transmitted over an audio network, such as a telephone network, and the video frame is transmitted over a digital network, such as an intranet. The audio frame may be combined with additional audio signals from an audio bridge. The receiver receives the audio signal from the audio bridge and performs the same hash function on the mixed signal as was performed on the original signal. The receiver correlates the hash value on the mixed signal with the hash value included with the video frame (wherein the video frame is one of several video frames buffered by the receiver). The receiver can thus identify the video frame that corresponds to the audio frame and render them simultaneously.

18 Claims, 8 Drawing Sheets

RTP Video Packet

500

RTVideo Packet

600

SIP INFORMATION
PACKET
700

AUDIO/VIDEO SYNCHRONIZATION USING AUDIO HASHING

BACKGROUND

It is important in streaming applications that audio is played at the same time that a video event creating the audio is rendered. Such synchronization of audio and video signals provides fewer distractions to a user than audio and video that is even a few (e.g. >30) milliseconds out of synchronization.

Traditionally, synchronization of streaming audio and video signals has been accomplished by time stamping audio and video frames at a sender. A receiver buffers the audio and video signals and renders them according to their time stamps. The time-stamped audio and video signals must be transmitted over a digital network, such as an IP (Internet Protocol) network or an ISDN (Integrated Services Digital Network), where the time stamps can be digitally embedded in the stream as a field. The digital network may not have quality of service (QoS), which may result in unreliable service.

In some situations, such as a video conferencing scenario, the audio signal may be transmitted over a different type of network than the video signal. For example, while the video may be sent via IP or an ISDN, the audio may be sent over a PSTN (Public Switching Telephone Network), which has QoS and is highly reliable and ubiquitous. However, such a network transmits analog signals and there is no simple method for embedding a time stamp in an analog signal.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Overview

The following description presents systems, method and computer-readable media that can be used to synchronize audio signals transmitted over a network that does not embed timestamps into an audio stream (such as an analog network) with video signals transmitted over a digital network (wherein timestamps are embedded into an audio stream). In particular, the techniques are described with regard to a video conferencing system. However, the described techniques may be used in virtually any system in which there is a need to synchronize audio and video signals wherein the signals are transmitted over different types of networks.

In the following description, an audio hashing technique is used to uniquely identify an audio frame. A sender receives the audio and video signals and computes a hash of a frame of the audio signal. The audio hash is then added to a corresponding video frame. The sender then transmits the audio signal via an analog network (e.g. PSTN) and the video signal via a digital network (e.g. an IP network).

The audio signal may be transmitted via an audio bridge or a multi-point control unit (MCU) where it may be mixed with other audio signals. This is common in a video conference scenario, where one or more meeting participants may join a video conference via telephone. However, it will be shown below that the techniques described herein are not affected by the inclusion of additional audio signals.

A receiver receives and buffers the audio and video signals. However, the signals will usually be unsynchronized when they are received. The receiver computes an audio hash of a frame of the audio signal. The audio hash utilized by the receiver is the same hash function that was applied at the sender, the result of which is included in the video frames.

After computing the hash of an audio frame, the receiver compares the computed hash with multiple hash values contained in a series of the video frames. When a similar hash value is found in a video frame, the receiver matches the video frame with the audio frame from which the hash value originated. The audio and video frames are then rendered in synchronization.

The hashing function used in the present description is the MFCC (Mel Frequency Cepstral Coefficients) technique, though other functions like a spectrogram can also be used. MFCC is used in speech recognition applications and is appropriate for the present techniques because it is relatively robust to external noise (e.g. from the audio bridge) due to utilization of several frequency bins. External noise will not affect every frequency bin and that property can be exploited in the signal matching process described herein. A key attribute that is exploited for the hash function is additive noise, which generally increases the magnitude of the function. Further details of the audio hashing and signal matching processes are described below.

General Architecture

Figure 1:
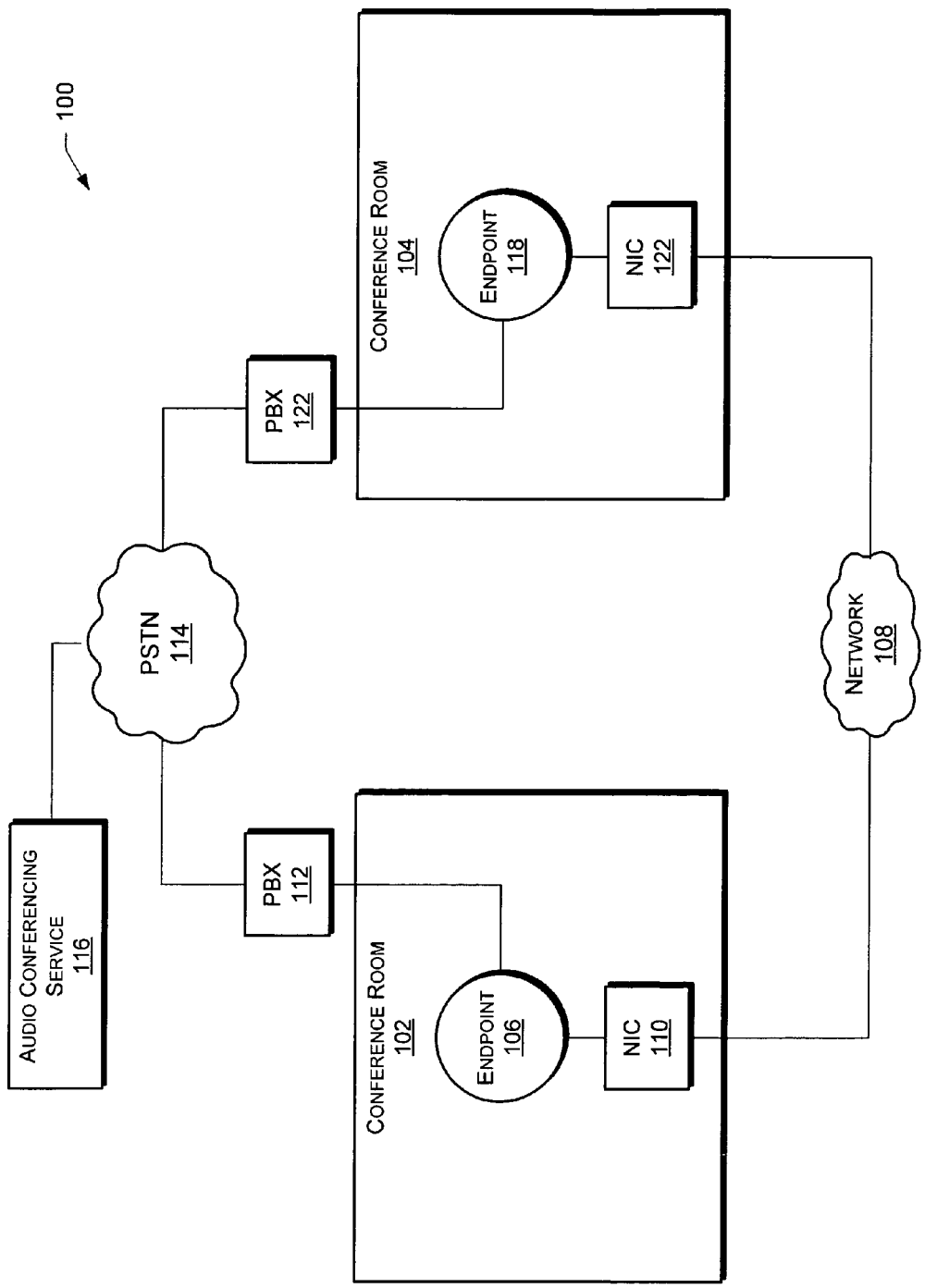
FIG. 1 is a general video conferencing architecture in accordance with the present description.

FIG. 1 is a block diagram of a general video conferencing architecture 100 in accordance with the present description. The general video conferencing architecture 100 is merely exemplary and provides a context for further discussion below. Although described in the context of a video conferencing system, the techniques discussed herein may be applied in a variety of audio/video contexts.

The general video conferencing architecture 100 includes conference room 102 and conference room 104. Conference room 102 includes an endpoint device 106 that is configured to image conference participants situated in conference room 102 and transmit said images to a remote location. As will be shown with respect to one or more subsequent figures, the endpoint device 106 includes other functions, such as audio reception and transmission, A/V processing and the like. It is noted that the endpoint device 106 may be included in multiple units but, for convenience, is shown here as a single unit.

The endpoint device 106 communicates with a network 108 via a network interface 110. The network 108 is a digital network (e.g. IP, UDP, ISDN, etc.) by which audio and video signals may be transmitted and the network interface 110 is appropriate for use with the endpoint device 106 and the network 108.

The endpoint device 106 also interfaces with a PBX (private branch exchange) 112 to communicate with a public switching telephone network (PSTN) 114. The PSTN also communicates with an audio conferencing service 116 that is configured to connect audio conference calls between two or more entities.

Conference room 104 also includes an endpoint device 118, which communicates with the network 108 via a network interface 120. The endpoint device 118 also interfaces with a PBX 122. The PBX 122 interfaces with the PSTN 112 so that the endpoint device 106 in conference room 102 can communicate with the endpoint device 118 in conference room 104.

In one or more examples described below audio signals are transmitted from conference room 102 to conference room 104 via the PSTN 112. Video signals are transmitted from conference room 102 to conference room 104 via the network 108. The following description deals with synchronizing the audio and video signals when they are received at conference room 104.

Exemplary Conferencing Device

Figure 2:
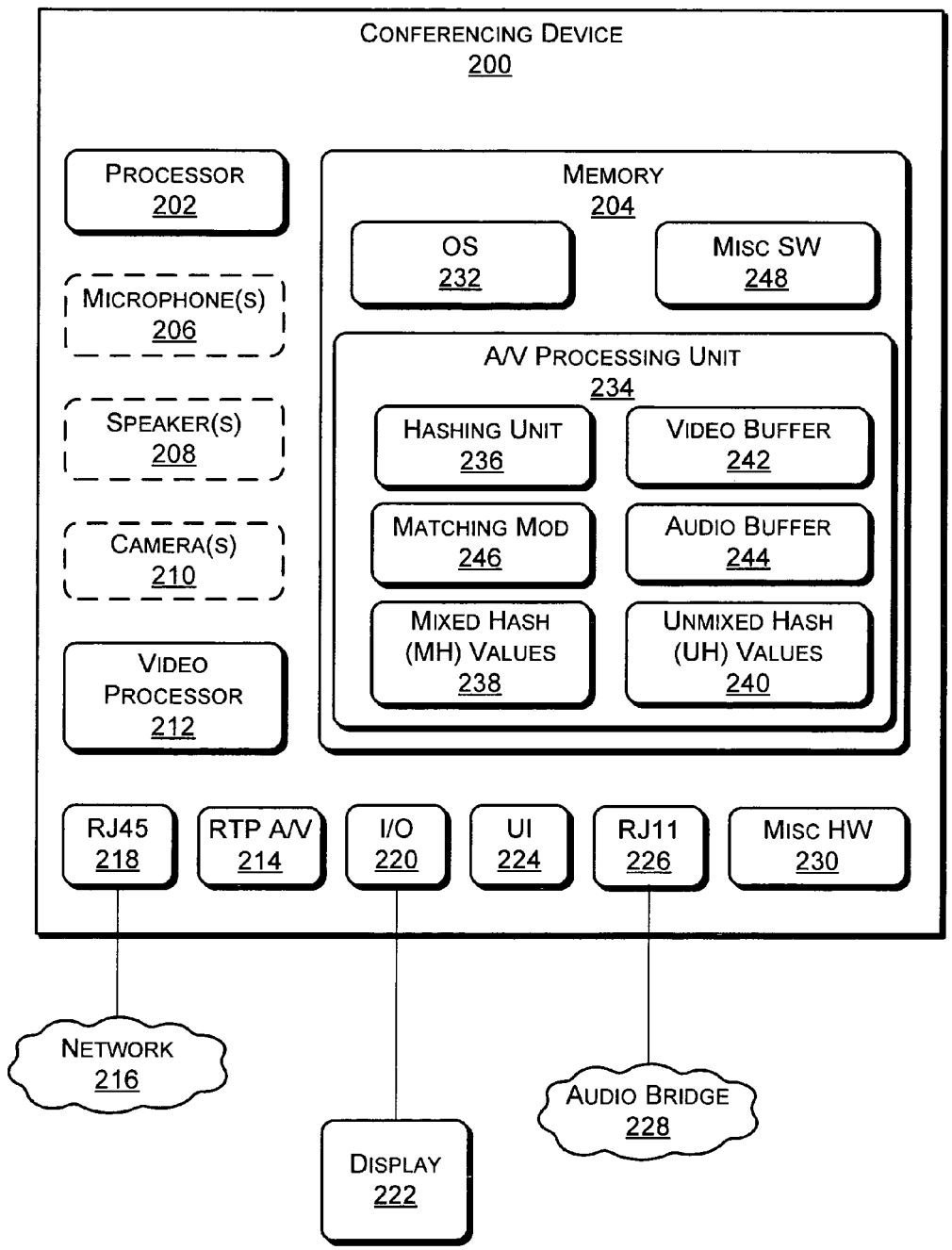
FIG. 2 is a block diagram of an exemplary conferencing device.

FIG. 2 is a block diagram of an exemplary conferencing device 200 in accordance with the present description. The exemplary conferencing device 200 is similar to the endpoint devices 106, 118 shown in FIG. 1. In the following discussion, certain functions are attributed to particular elements of the exemplary conferencing device 200. However, it is noted that any functionality attributed to a particular element may be allocated to one or more different elements and/or devices in keeping with the present description.

The exemplary conferencing device 200 includes a processor 202 and memory 204. The exemplary conferencing device 200 is shown as having one or more microphones 206, one or more speakers 208 and one or more cameras 210, although these elements may be included in a separate self-contained camera unit that interfaces with the exemplary conferencing device 200.

A video processor 212 converts camera images to a transmittable protocol such as RTP (Real-time Transport Protocol) and resultant RTP audio/video (A/V) 214 is sent over a digital network 216 via a network interface unit such as an RJ45 interface 218.

The exemplary conferencing device 200 also includes in input/output unit 220 that interfaces with a display device 222, such as a video projector or a monitor. A user interface module 224 includes means for displaying information to a user and/or receiving user input. The user interface module 224 may also include computer-executable instructions for processing information provided to and/or received from a user.

An audio network interface unit such as an RJ11 interface 226 is included and connects the exemplary conferencing device 200 to an audio bridge 228 that integrates audio input from multiple sources (not shown). Other miscellaneous hardware 230 necessary to perform functions ancillary to those specifically described with regard to the exemplary conferencing device 200 is also included.

The memory 204 stores an operating system 232 that controls general functionality of the exemplary conferencing device 200 and operations between components of the conferencing device 200. The memory 204 also stores an audio/visual processing unit 234 that is configured to synchronize audio and video signals received by the exemplary conferencing device 200 as described herein.

The A/V processing unit 234 includes a hashing unit 236 that is configured to hash audio signals to derive one or more hash values from received audio signals. Said hash values are referred to herein as mixed hash values 238 and are stored in the memory 204. The term "mixed" refers to the fact that audio signals from a sender are mixed with other audio signals integrated in the audio bridge 228 or with extraneous noise.

The hashing unit 236 is also configured to hash audio signals that originate from the conferencing device 200 and transmit therefrom. Unmixed hash values 240 results from hashing originating audio signals because the hash is performed prior to the audio signals being mixed with extraneous audio signals in the audio bridge 228.

The A/V processing unit 234 also includes a video buffer 242 and an audio buffer 244. The video buffer 242 is used to store multiple frames of video information received from a sender. The audio buffer 244 stores multiple frames of audio information received from the sender, the audio frames corresponding to the video frames that are stored in the video buffer 242.

A matching module 246 is included in the A/V processing unit and is used in an audio/video synchronization technique described herein to match unmixed hash values 240 with mixed hash values 238. When an audio signal is received, the hashing unit 236 hashes an audio frame to derive a mixed hash value. The mixed hash value is then compared to several unmixed hash values that are included with video frames to identify a video frame that corresponds to the audio frame from which the mixed hash value is derived. The audio frame and the corresponding video frame can then be rendered simultaneously so as to synchronize the audio and-video signals.

Other miscellaneous software elements 248 may be included in the memory 204 of the exemplary conferencing device in order to provide some of the functionality required to support the techniques described herein. Elements and functions associated with the exemplary conferencing device 200, including the hashing and matching functions, are described in greater detail below, with respect to subsequent figures.

Exemplary A/V Synch. System and Methodological Implementation

Figure 3:
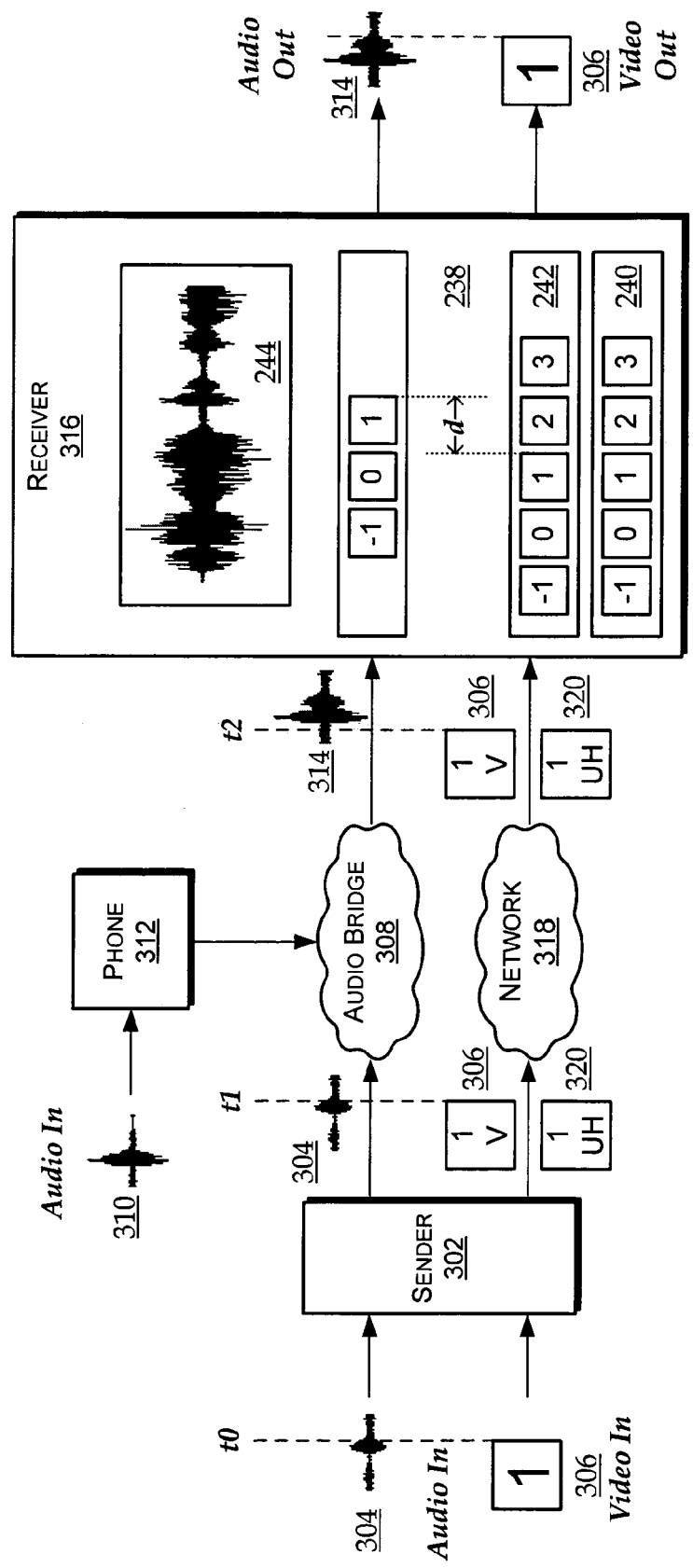
FIG. 3 is a diagram of an exemplary audio/visual system.
Figure 4:
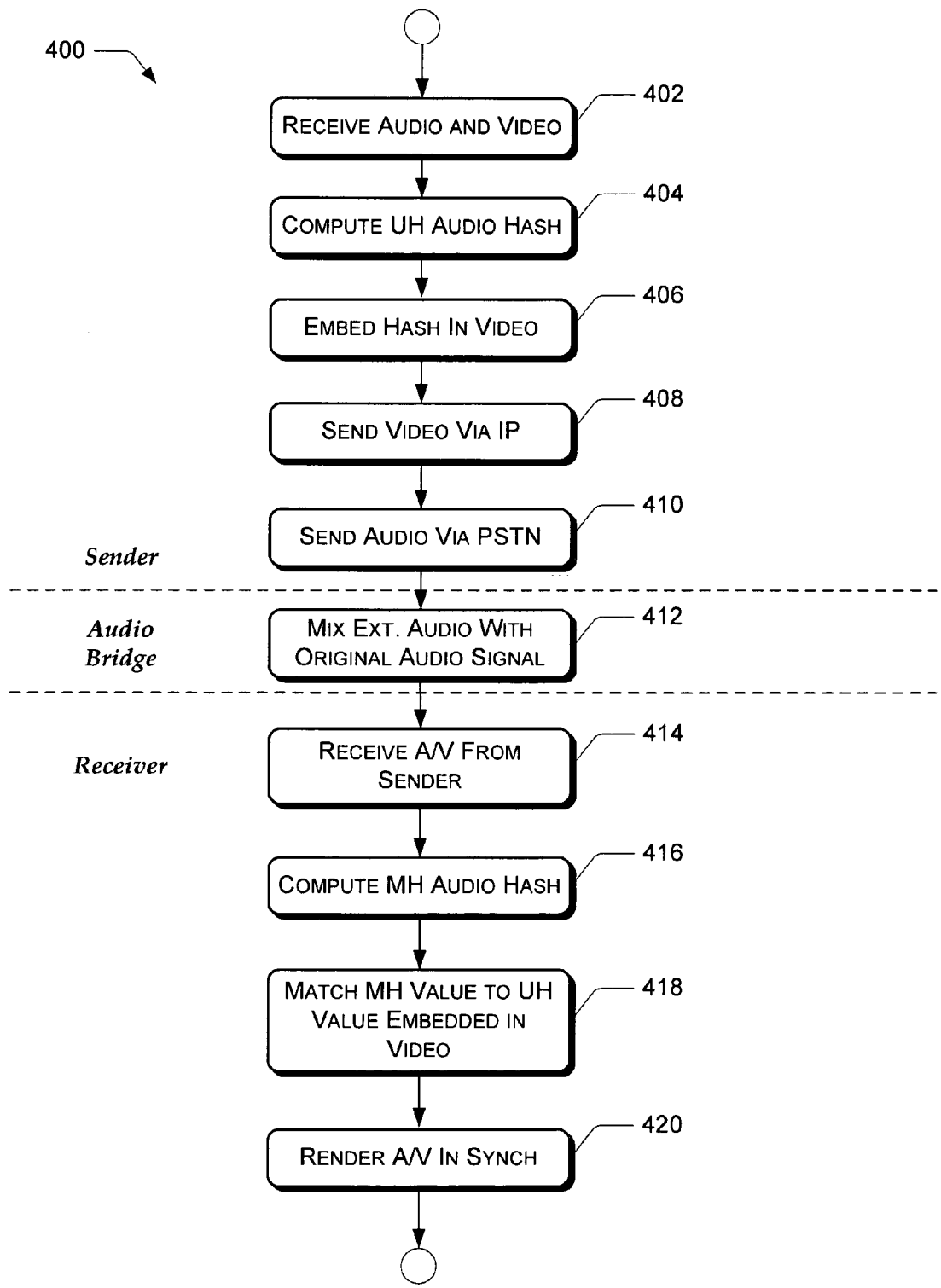
FIG. 4 is a flow diagram of a methodological implementation of an audio/video synchronization process.

FIG. 3 is a diagram of an exemplary audio/visual synchronization system 300 in accordance with the present description. FIG. 4 is a flow diagram 400 depicting an exemplary methodological implementation for synchronizing audio received over an analog network with video received over an IP network. FIG. 3 and FIG. 4 will be discussed in conjunction with one another in the following discussion.

In the following discussion, continuing reference is made to the elements and reference numerals shown in previous figures. Also, it is noted that allocation of functions described herein are not necessarily required to be performed by one or more elements to which such functionality is attributed. Appropriate tasks and/or processes may be implemented among any components shown or implied in the figures included herewith.

At block 402 of FIG. 4, a sender 302 (FIG. 3) receives an audio signal 304 and a video signal 306 from an audio and video source. Although not required, the sender 302 may be similar to the conferencing device 200 of FIG. 2. In the following discussion, it is assumed that the sender 302 is the conferencing device 200 and that the sender 302 includes the components shown and described in the conferencing device 200. Although this step appears to imply that the audio and video signals are received from a remote source, the audio and video signals may also be initially detected through components in the sender 302. For example, the audio and video signals may be received from integrated elements such as the microphone(s) 206 and camera(s) 210 shown in FIG. 2.

FIG. 3 shows the audio signal 304 and the video signal 306 represented at time t0, at which time a video frame (1) is synchronized with an audio frame.

At block 404, the hashing unit 236 of the sender 302 computes a hash value (unmixed hash values 240) from a frame of the audio signal 304. The hashing function used to compute the hash value may be one of many hashing functions known in the art. An appropriate hashing function should have as many of the following properties as possible:

Robust to noise and possible added speech;

Provide adequate discrimination between a hash of an original audio signal and a hash of a mixed audio signal that contains the original audio signal and other audio signals;

Computational efficiency;

Compactness, i.e., uses only a few bytes per audio frame.

One function that may be used with the techniques described herein and which will be described in subsequent examples, is Mel-Frequency Cepstral Coefficients (MFCC). MFCC is well known in the art and is frequently used in speech recognition processes.

MFCC are used to provide a low-level representation of the spectral shape of a speech signal. In general, the MFCC representation of a sound is computed by sampling its magnitude spectrum to match critical bands that are related to auditory perception. MFCC are perceptually weighted according to sounds audible to the human ear. MFCC assumes that human ears have high resolution on low frequency components of sound and low resolution on high frequency components. The threshold is typically set to 1,000 Hz (1 kHz).

One feature of MFCC that can be exploited for the purposes described herein is that the MFCC frequency bins of a mixed signal will usually be greater or equal to the unmixed signal. Phase errors can cause this to be false sometimes, but generally this property is true.

In a video conferencing (or teleconferencing) situation, additional audio signals created by a person conferencing on a remote telephone will not always occur at the same time as every audio signal emanating from a conference room. This means that some frequency bins will be the same in both the MFCC representation of the mixed audio signal and the MFCC representation of the unmixed audio signal. This characteristic is helpful in determining similarities between mixed audio signals and unmixed audio signals as described below.

Referring back to FIGS. 3 and 4, at block 406 the video processor 212 of the sender 302 embeds the unmixed hash value 240 from the audio frame into the signal of the corresponding video frame (frame 1, FIG. 3). Typically, this can be done by including a hash field in a data packet corresponding to the video frame. Any technique known in the art for embedding such a value in a video frame may be used.

One or more improved techniques for embedding the hash value in the video signal are described in greater detail below.

At block 408, the sender 302 transmits the video signal 306 to the receiver 316 via a digital network 318, such as an intranet or the Internet. The digital network may accord with any known digital transmission protocol, such as IP, UDP, ISDN, etc. The video signal transmitted by the sender 302 includes an unmixed hash value 320 that is a result of applying a hashing function to the corresponding audio frame 304.

At block 410, the sender 302 transmits the audio signal (original, unmixed) to an audio bridge 308. The audio bridge 308 is any conferencing calling system that allows multiple participants to be connected from various remote locations.

The audio bridge 308 shown in FIG. 3 is shown mixing the audio signal 304 with a secondary audio signal 310 that is transmitted from a remote phone 312 to the audio bridge 308 (FIG. 4, block 412). In practice, more than one phone or other device may provide audio signals to the audio bridge 308 that the audio bridge will combine with the unmixed audio signal 304 for subsequent transmission. The audio bridge 308 then transmits a mixed audio signal 314 to a receiver 316.

At a time t1 that the sender 302 transmits the audio frame 304 and the video frame 306 with the embedded hash value 320, the audio and video frames are still synchronized. After the video signal 306/hash value 320 propagates through the network 318 to time t2, the mixed audio signal 314 is no longer synchronized with the video signal 306/hash value 320.

At block 414, the receiver 316 receives the mixed audio signal 314 and the video signal 306 that includes the embedded unmixed hash value 320. In the present example, the receiver 316 is the conferencing device 202 of FIG. 2. Further reference to the receiver 316 includes references to components shown in FIG. 2.

The mixed audio signal 314 is stored in the audio buffer 244 of the A/V processing unit 234 and the frames of the mixed audio signal 314 are used as a master clock for the synchronization of the audio and video signals. The hashing unit 236 of the receiver 316 computes a hash value of the mixed audio signal 314 (i.e. a mixed hash value 238) at block 416.

At this point, the frame of the mixed audio signal 314 is known. The video frame that corresponds to the frame of the mixed audio signal 314 must be identified so that they can be rendered at the same time. The following discussion describes at least one technique that can be used to identify a video frame that corresponds with a particular audio frame.

Frame Matching

At block 418, the mixed hash value 238 is matched to an unmixed hash value 240 embedded in a video frame. When an audio frame is selected to play, a corresponding video frame is selected from the video buffer 242 using a delay (d, FIG. 3). The delay (d) is updated using the following algorithm:

$$A(t, d) = \sum_{i=0}^{n-1} S(MH(t - i\tau + d), UH(t - i\tau))$$

where:

MH(t) is a mixed hash value at time t;

UH(t) is an unmixed hash value at time t,

S(mh, uh) is the similarity between two hash values mh and uh;

A(t) is the sum of the similarities over n prior frames;

n is the number of hash values used to determine a match; and $\tau$ is the video frame sampling interval (e.g. 33 ms).

As previously noted, one function that may be utilized in the matching process is MFCC. MFCC is an appropriate function to use since it has multiple frequency bins and external noises, such as additional audio mixed from the audio bridge, won't affect every bin. Using MFCC, the similarity function that can be utilized with the calculation of the delay is:

$$S(mh, uh) = \sum_{i=0}^{q-1} B(mh_i, um_i)$$

where:
mh=the mixed hash value (MFCC);
uh=the unmixed hash value (MFCC);
q is the number of MFCC bins; and
B is a function of MFCC bins m and u:

$$B(m, u) = \begin{cases} m - u & \text{if } m + \varepsilon >= u \\ p & \text{otherwise} \end{cases}$$

where p is a penalty value and ε accounts for random noise measurement errors in the bins. For example, if the MFCC bins are normalized to [0,1], then p is equal to 1.

A key feature of this particular similarity function is that MH(t)>=UH(t) since the mixed signal only adds energy to the MFCC bins compared to the unmixed signal. If a mixed bin, m, has less energy than an unmixed bind, u, then it is very unlikely that the hash values match. Therefore, B is given a penalty value, p, to ensure that this match is not successful.

Finally, the delay (d) at time (t) is the d that minimizes A(t,d):

$$d(t) = \arg_d \min A(t, d).$$

The delay may be filtered so that it doesn't change very quickly. The delay is only used if A(t,d)<Z, where Z is a threshold empirically determined that decides if the match is adequate. If a delay cannot be found for a particular audio frame, then an old delay may be used.

It is noted that an initialization tone may be created at the send to initialize synchronization for a communication session. Otherwise, if the sender is completely silent, the first words the sender says will not be synchronized.

Now that the video frame that corresponds to the audio frame has been identified, the receiver 316 renders the mixed audio signal 314 and the video signal 306 at block 420. As a result, the audio and video portions of the streaming A/V are synchronized.

Embedding a Hash Value In a Video Frame

The present description calls for embedding an identifying value—such as a hash of an audio signal—into a video frame. There are several ways in which this can be accomplished and some are described below. However, the ways to accomplish the embedding that are described below are not the only ways to do so. Any method known in the art to embed a value into a video signal that can be used to correlate the video signal with a corresponding audio signal may be used with the techniques described herein.

RTP Video

One way in which the embedding can be accomplished has been referred to above, namely, that a hash value of an unmixed audio signal is included in an RTP (Real-time Transport Protocol) video packet. RTP provides a wrapper for a particular codec (or audio, video or data) that is used to transmit a video signal. RTP allows a video signal to be packetized so that the signal is more easily handled by a transmission network.

Figure 5:
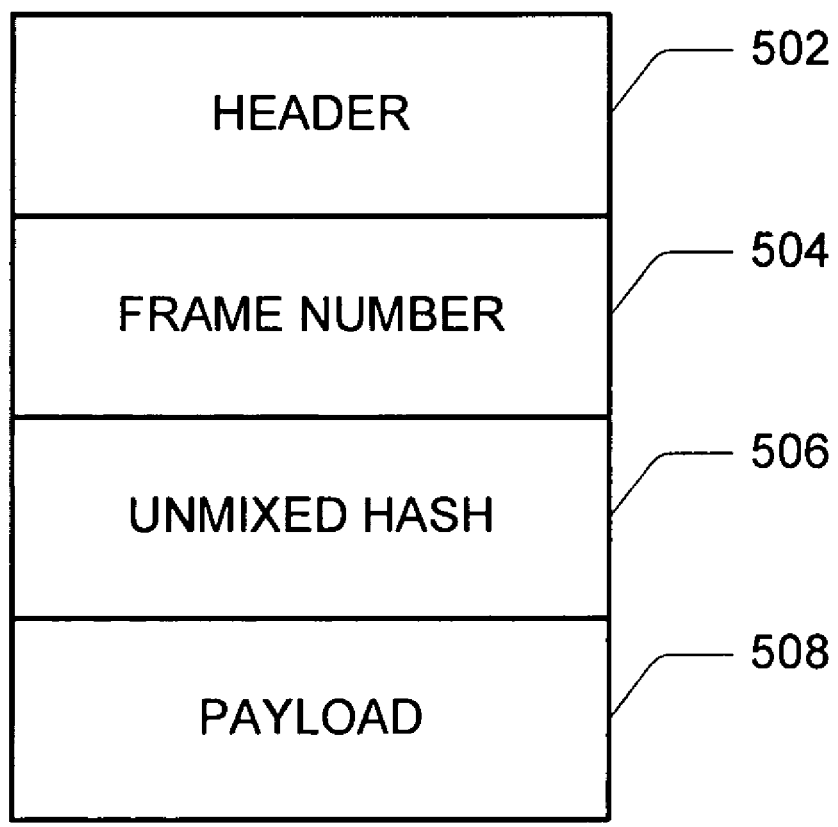
FIG. 5 is a diagram of an exemplary RTP (Real-time Transport Protocol) video packet.

FIG. 5 is a simplified illustration of an RTP video packet 500 that includes a header 502, a frame number field 504, an unmixed hash value 506 and an RTP video payload 508. Thus, unmixed hash values 506 are bound to their corresponding video frame number 504 and video frames (i.e. video payload 508).

An advantage to utilizing RTP to embed the unmixed hash values is that this technique is codec agnostic. That is, the technique works with most codecs without having to know which type of codec is being used or having to alter the codec.

RTVideo

An alternative to embedding the unmixed hash values in RTP video is embedding the values in the user data section of the codec video stream. The primary advantage of this is the hash values are more likely to be forwarded by media relays, which may strip non-standard RTP packet data. Many RT (Real-Time) video compression standards, such as H.263, H.264, etc., support user-defined data in component packets. The unmixed hash signals can be included in said user-defined data.

Figure 6:
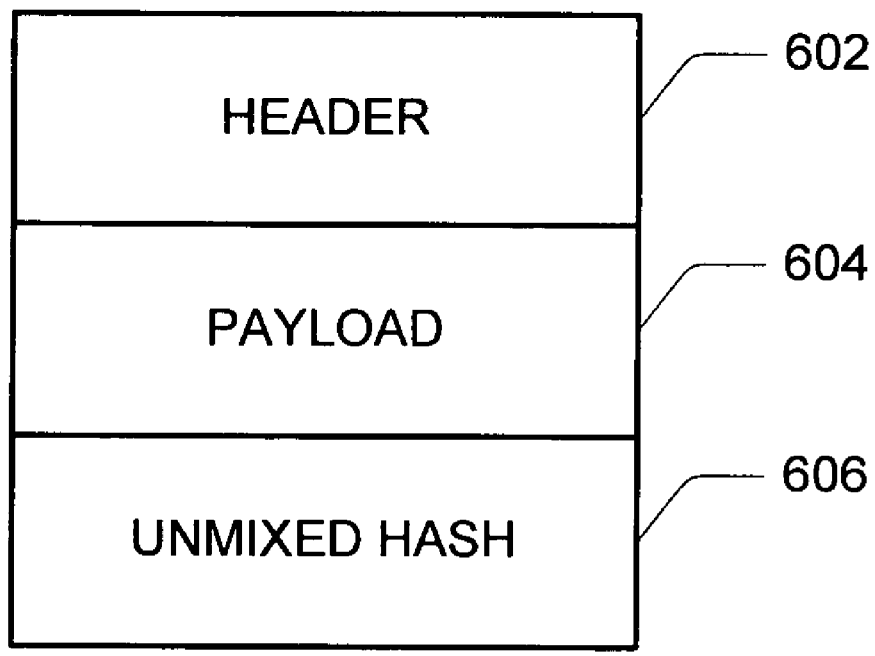
FIG. 6 is a simplified illustration of an exemplary RT video packet.

FIG. 6 is a simplified illustration of an RTVideo packet 600 that includes a standard header 602 and payload 604. The payload includes one or more video frames—typically multiple video frames. In at least one implementation, one or more unmixed hash values 606 are appended to the payload 604 of the RTVideo packet 500.

Embedding the unmixed hash values in RTVideo may require some knowledge of the compression scheme that is used in transmitting the video and some compression schemes may not support user-defined data. However, those skilled in the art will readily recognize codecs that support such user-defined data and any changes that may be made to other codes to support the embedded unmixed hash values.

Session Initiation Protocol (SIP)

In yet another implementation, a separate channel is used to transmit the unmixed hash value over the same network that is used to transmit the video signal. Typically, to establish a communication session, a sender will initiate a SIP (Session Initiation Protocol) sequence wherein the sender transmits a request for a session to a receiver.

SIP information packets are exchanged between the sender and the receiver to establish and control a communication session. The sender can send packets that contain unmixed audio hash values and corresponding video frame numbers to the receiver in SIP information packets.

Figure 7:
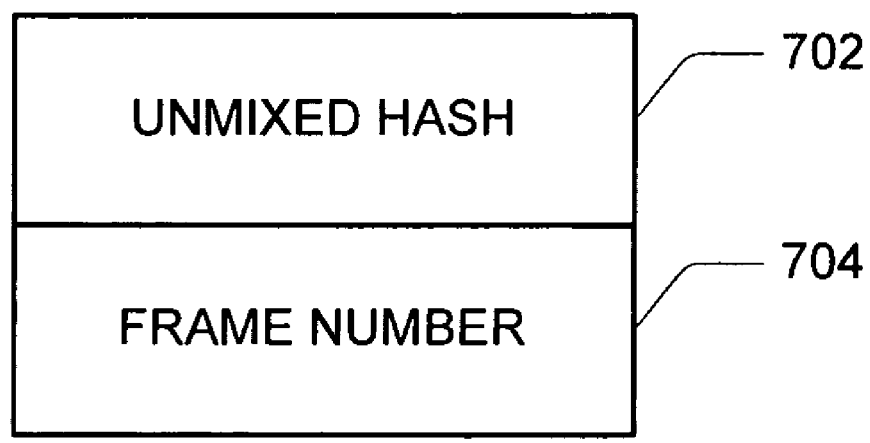
FIG. 7 is a diagram of an exemplary SIP information packet.

FIG. 7 is a simplified illustration of a SIP information packet 700 that includes an unmixed audio hash value 702 and a frame number 704. The unmixed audio hash value 702 can be used by the receiver as described above to synchronize audio and video frames. The frame number 704 is used to correlate the unmixed audio hash value 702 with a video frame in the video buffer (FIG. 2, 242). The frame number 704 can be any value—such as a time stamp—that identifies a particular video frame.

Since the unmixed audio hash value 702 is associated with a particular video frame, the techniques described above can be used to identify an audio frame that corresponds to the unmixed hash value 702 and, subsequently, to a video frame that corresponds to the audio frame.

Using SIP information packets to transmit unmixed audio hash values is advantageous because RTP packets and/or codecs do not have to be altered. When using SIP information packets, however, the receiver must be able to tie in the fact that the receiver is receiving SIP information packets that include the unmixed audio hash values. For example, the A/V processing unit 234 can be configured to find the appropriate information in the SIP information packets in the synchronization process.

Exemplary Operating Environment

Figure 8:
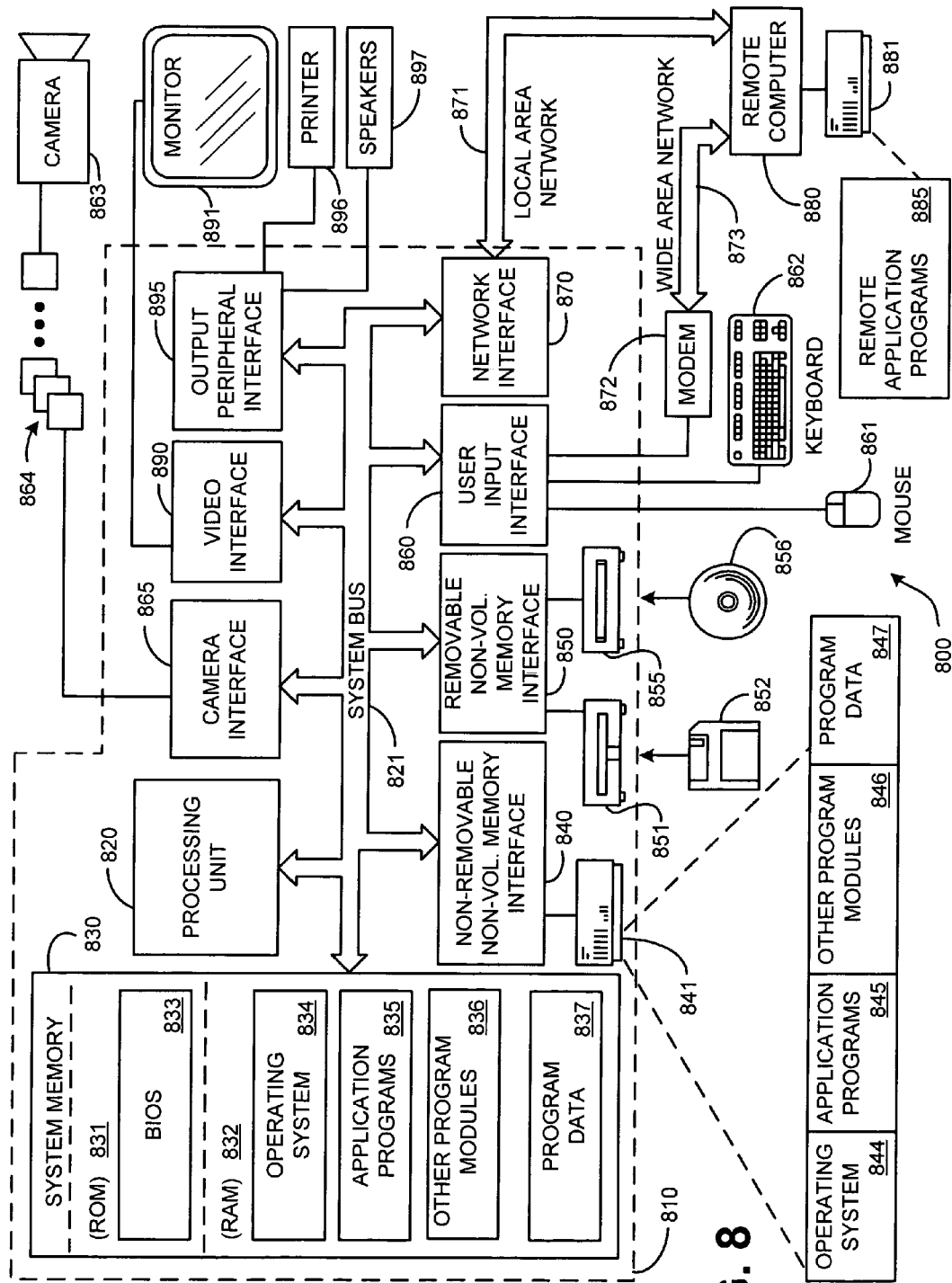
FIG. 8 is a block diagram depicting an exemplary general purpose computing/camera device.

FIG. 8 is a block diagram depicting a general purpose computing/camera device. The computing system environment 800 is only one example of a suitable computing environment and is not intended to suggest any limitation as to the scope of use or functionality of the claimed subject matter. Neither should the computing environment 800 be interpreted as having any dependency or requirement relating to any one or combination of components illustrated in the exemplary operating environment 800.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or the like. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through anon-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895. Of particular significance to the present invention, a camera 863 (such as a digital/electronic still or video camera, or film/ photographic scanner) capable of capturing a sequence of images 864 can also be included as an input device to the personal computer 810.

Further, while just one camera is depicted, multiple cameras could be included as an input device to the personal computer 810. The images 864 from the one or more cameras are input into the computer 810 via an appropriate camera interface 865. This interface 865 is connected to the system bus 821, thereby allowing the images to be routed to and stored in the RAM 832, or one of the other data storage devices associated with the computer 810. However, it is noted that image data can be input into the computer 810 from any of the aforementioned computer-readable media as well, without requiring the use of the camera 863.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

CONCLUSION

While one or more exemplary implementations have been illustrated and described, it will be appreciated that various changes can be made therein without departing from the spirit and scope of the claims appended hereto.

The invention claimed is:

1. A method, comprising:
    receiving an audio signal and a corresponding video signal;
    applying a data reduction technique to the audio signal to derive a digital signature that identifies the audio signal;
    transmitting the audio signal to a receiver via an audio network; and
    transmitting the video signal and the audio digital signature to the receiver via a digital network wherein the audio digital signature is included in a SIP (Session Initiation Protocol) packet with a corresponding video frame number, and wherein the method is performed by a processor.

2. The method as recited in claim 1, wherein the video signal and the audio digital signature are transmitted over separate channels of the digital network.

3. The method as recited in claim 1, further comprising combining the audio digital signature with the video signal for transmission over the digital network.

4. The method as recited in claim 3, wherein the combining further comprises combining the audio digital signature with a Real-time Transport Protocol (RTP) video packet.

5. The method as recited in claim 3, wherein the combining further comprises appending the audio digital signature to a payload portion of an RTVideo packet.

6. The method as recited in claim 3, wherein the combining further comprises embedding the audio digital signature in a header extension of an RTP video packet.

7. The method as recited in claim 1, wherein the data reduction technique further comprises a hashing function.

8. The method as recited in claim 1, wherein the data reduction technique further comprises a Mel-Frequency Cepstral Coefficients (MFCC) method to the audio signal.

9. The method as recited in claim 1, wherein the steps of the method are performed for each of multiple frames of the audio signal and corresponding multiple frames of the video signal.

10. A system, comprising:
    audio reception means for receiving multiple frames of an audio signal via an audio network, the audio signal including an original audio signal and one or more additional audio signals;
    hashing means for deriving a mixed hash value of each audio frame by applying a hashing function to the audio signal contained within the audio frame;
    video reception means for receiving multiple frames of a video signal via a digital network, each video frame corresponding to an audio frame of the audio signal;
    means for receiving multiple unmixed hash values via the digital network wherein at least one of the unmixed hash values are included in a SIP (Session Initiation Protocol) packet with a corresponding video frame number, there being an unmixed hash value corresponding to each video frame, the unmixed hash value for a video frame being derived by applying the hashing function to a corresponding frame of the original audio signal;
    correlation means for correlating a mixed hash value with an unmixed hash value to identify a video frame associated with the unmixed hash value that corresponds to an audio frame associated with the mixed hash value; and
    rendering means for rendering the correlated audio frame and video frame in synchronicity.

11. The system as recited in claim 10, wherein the video frames and the unmixed hash values are received over different channels of the digital network.

12. The system as recited in claim 10, wherein the unmixed hash value is included with the corresponding video frame.

13. The system as recited in claim 12, wherein the unmixed hash value is included in a transmission packet carrying the video frame.

14. The system as recited in claim 12, wherein the unmixed hash value is included in a header extension of an RTP packet transporting the video frame.

15. The system as recited in claim 10, wherein the hashing means further comprises an MFCC function.

16. One or more computer storage media embodied with executable instructions that, when executed, implement the following method:
    hashing an audio frame of an audio signal to derive an unmixed hash value;

combining the unmixed hash value with a video frame of a video signal, the video frame corresponding to the audio frame;

transmitting the audio frame to a receiver over an analog network; and transmitting the video frame and the unmixed hash value to the receiver over a digital network wherein the unmixed hash value is included in a SIP (Session Initiation Protocol) packet with a corresponding video frame number.

17. The one or more computer storage media as recited in claim 16, wherein the hashing step further comprises applying an MFCC function to the audio frame.

18. The one or more computer storage media as recited in claim 16, wherein the analog network farther comprises a PSTN and the digital network further comprises an IP network.

\* \* \* \* \*